United States Patent [19]
Lin et al.

[11] Patent Number: 4,719,247
[45] Date of Patent: Jan. 12, 1988

[54] DEFORMABLE POLYURETHANE HAVING IMPROVED CURE TIME

[75] Inventors: Nai W. Lin, Mickleton; Richard W. Niedt, Woodbury, both of N.J.

[73] Assignee: ICI Americas Inc., Wilmington, Del.

[21] Appl. No.: 12,972

[22] Filed: Feb. 10, 1987

[51] Int. Cl.$^4$ .............................................. C08G 18/14
[52] U.S. Cl. .................................. 521/159; 252/182; 521/160; 521/161; 521/163; 528/49; 528/60; 528/65; 528/66; 528/67; 528/73; 528/76; 528/83
[58] Field of Search ............... 521/159, 160, 161, 163; 528/67, 73, 76, 83, 49, 60, 65, 66; 252/182

[56] References Cited
U.S. PATENT DOCUMENTS
3,194,793  7/1965  Kogon ................................. 521/163

FOREIGN PATENT DOCUMENTS
2160881A  1/1986  United Kingdom .

Primary Examiner—Maurice J. Welsh
Attorney, Agent, or Firm—James T. Jones

[57] ABSTRACT

A system for use in making molded polyurethane objects by an open or closed casting process, said system comprising
(A) an aromatic polyisocyanate; and
(B) an active hydrogen-containing composition comprising
  (i) a polyhydric alcohol having an average molecular weight in the range of about 1000 to about 8000 and an average functionality of about 2 to about 4;
  (ii) a polyhydric alcohol having 2 to 12 carbon atoms and an average functionality of about 2 to about 3; and
  (iii) a secondary monoamine of the formula

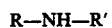

R—NH—R' wherein R and R' are independently saturated aliphatic groups having 1 to 20 carbon atoms, provided that said secondary monoamine contains at least 4 carbon atoms.

52 Claims, No Drawings

DEFORMABLE POLYURETHANE HAVING IMPROVED CURE TIME

FIELD OF THE INVENTION

This invention relates to a polyurethane partially capped with disubstituted urea groups which exhibits delayed recovery following deformation, which can be used to make molded articles by an open or closed casting system, optionally with low pressure injection, but which has a much faster cure rate relative to the corresponding polyurethane capped with a primary alcohol. The invention further relates to a reaction system and to an active hydrogen-containing composition used to make the polyurethane.

BACKGROUND OF THE INVENTION

Polyureas, polyurethanes, and polyurethaneureas are well known to the polymer arts and are made by reacting a polyisocyanate with one or more active hydrogen containing materials. In the case of polyureas a polyamine is reacted with a polyisocyanate to form a polymer containing urea (—NH—CO—NH—) linkages. In the case of polyurethanes a polyhydric alcohol is reacted with a polyisocyanate to form a polymer containing urethane (—O—CO—NH—) linkages. Polyurethaneureas, as the name implies, are made by reacting a mixture of polyamine and polyhydric alcohol with a polyisocyanate to yield a polymer having mixed (urethane and urea) linkages.

Generally, polyamines react with polyisocyanates (to form polyureas) at a much faster rate than polyhydric alcohols (to form polyurethanes) and are thus prime candidates for use in fast reaction injection molding (RIM) systems. In such systems secondary amine groups react more slowly than primary amine groups.

In slower molding reaction systems such as those designed for use with open casting low pressure apparatus, however, even the more slowly reacting secondary amines are generally still too reactive for use therein, and the (polyurea) amine/isocyanate composition tends to cure and "set up" before the mold has entirely filled.

Thus open casting systems tend to be used most often with polyurethane systems. Such systems, comprising a polyol and polyisocyanate as described above, react slowly enough to allow more than adequate mold filling time, but herein also lies a disadvantage in such systems since their in-mold residence (cure) time, i.e. the amount of time before a molded article can be demolded without damage, can be long enough to adversely affect production.

A modified polyurethane casting is disclosed in U.K. Patent Application No. 2160881 published Jan. 2, 1986, the polyurethane material being prepared by the reaction of (a) an essentially primary hydroxyl tipped polyol having a molecular weight in the range of from 2,500 to 8,000:
(b) a polyhydric alcohol;
(c) an aliphatic monohydric primary alcohol containing up to 10 carbon atoms; and
(d) a polyisocyanate, the reaction being carried out at a isocyanate index of 1.0 or greater.

The above U.K. patent application states that the polyurethane materials disclosed therein have certain desirable properties, including being readily deformable, possessing delayed recovery characteristics, and being characterized by low compression set with high, temperature-insensitive damping over a broad temperature range. The present inventors have determined that such systems are, however, disadvantageous in that they require relatively long mold residence times.

SUMMARY OF THE INVENTION

The present invention provides a system for use in making molded objects by an open (mold) or closed (mold) casting process, said system comprising the following components:

(A) an aromatic polyisocyanate; and
(B) an active hydrogen-containing composition comprising
 (i) a polyhydric alcohol having an average molecular weight in the range of about 1000 to about 8000 and an average functionality of about 2 to about 4;
 (ii) a polyhydric alcohol having 2 to 12 carbon atoms and an average functionality of about 2 to about 3; and
 (iii) a secondary monoamine of the formula

R—NH—R' wherein R and R' are independently saturated aliphatic groups having 1 to 20 carbon atoms, with the proviso that R and R$^1$ together contain at least 4 carbon atoms, said system forming a polyurethane partially capped with disubstituted urea groups.

This invention further provides an active hydrogen containing composition, component (B), defined above.

This invention further provides polyurethanes, and molded objects therefrom, which are the reaction product of component (A) and component (B), the reaction being carried out at an isocyanate index between about 0.90 and about 1.15, preferably between 0.95 and 1.10. The molded polyurethanes are made by a low pressure casting process.

The phrases "polyhydric alcohol", "secondary monoamine", and "aromatic polyisocyanate" are intended to comprehend compositions containing mixtures of each as well as single species of each.

The present invention provides physical properties, including deformability and delayed recovery characteristics comparable to or better than polyurethane systems which specify the inclusion of a primary alcohol rather than applicants' secondary monoamine, component (B)(iii), such as the aforementioned U.K. patent application. Advantageously, the secondary amine-containing system of this invention allows ample time to fill an open cast mold, yet cures faster than the corresponding total polyol system (i.e. wherein the secondary monoamine is replaced by a primary alcohol), such that a significant increase in production over the total polyol system can be achieved. This is surprising inasmuch as the monoamine, being monofunctional, stops chain growth and would thus be expected to slow reactivity, as measured by gel time.

DETAILED DESCRIPTION

As the polyisocyanate, component (A), aromatic polyisocyanates having an average isocyanate functionality between about 2 and about 3, most preferably between 2 and 2.3, are preferred. Suitable polyisocyanates include, for example, p-phenylene diisocyanate, m-phenylene diisocyanate, 2,4-toluene diisocyanate, 2,6-toluene diisocyanate, naphthalene diisocyanate, dianisidine diisocyanate, 2,4'-diphenylmethane diisocyanate (2,4'MDI), 4,4'-diphenylmethane diisocyanate (4,4'MDI), 3,3'-dimethyl-4,4'-biphenylene diisocyanate, mixtures thereof and the like. The MDI (2,4' and 4,4') and mixtures and derivatives thereof are most preferred.

An additional preferred polyisocyanate is (methylene bridged) polymethylenepolyphenyl polyisocyanate compositions having an average isocyanate functionality greater than 2. Methylene bridged polyphenyl polyisocyanates are well known in the art and have the general formula

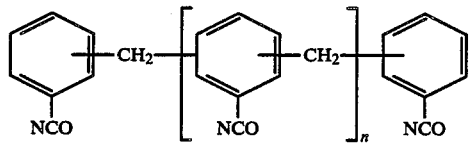

wherein n is an integer of 1 or more in the case of individual compounds and has an average value of 1 or more in the case of mixtures of such compounds. The latter referred to mixtures are commonly termed in the art as "crude MDI" or "polymeric MDI".

The term "polymethylene polyphenyl polyisocyanate" as used herein thus comprehends polymeric MDI mixtures which can contain significant amounts of monomeric MDI (i.e. n=0). Crude MDI can be made by phosgenating of a mixture of polyamines obtained from the acid condensation of aniline and formaldehyde.

The manufacture both of the polyamine mixtures and of the polyisocyanate mixtures therefrom is well known. The condensation of aniline with formaldehyde in the presence of strong acids, such as hydrochloric acid, yields a product containing diaminodiphenylmethane together with polymethylenepolyphenyl polyamines of higher functionality, the precise composition depending on the aniline/formaldehyde ratio.

The crude MDI can be made by phosgenating such polyamine mixtures, the various proportions of diamines, triamines and higher polyamines giving rise to like proportions of diisocyanates, triisocyanates and higher polyisocyanates.

The relative proportions of diisocyanates, triisocyanates and higher polyisocyanates in such crude MDI compositions in turn determine the average functionality of the compositions, that is, the average number of isocyanate groups per molecule. By varying the proportions of starting materials, the average functionality of the polyisocyanate compositions can be varied from little more than 2 up to 3 or even higher.

When preparing the compositions of the present invention, the crude MDI preferably has an average functionality from about 2.0 to about 3.0, most preferably from about 2.0 to about 2.3. Such compositions contain from 30 to 65 percent by weight of monomeric MDI, the remainder being higher order polymethylenepolyphenyl polyisocyanates of functionality greater than 2 together with by-products formed in the manufacture of such polyisocyanates by phosgenation. A particularly preferred polymethylenepolyphenyl polyisocyanate for preparing the polyisocyanate compositions is available from Rubicon Chemical Inc. under the trademark RUBINATE M.

Suitable aliphatic polyisocyanates include isophorone diisocyanate; 1,6-hexamethylene diisocyanate; 1,4-cyclohexyl diisocyanate; saturated analogues of the above mentioned aromatic polyisocyanates, mixtures thereof and the like. If aliphatic polyisocyanates are employed, they should be present in an amount less than 50 mole %, preferably less than 30 mole %, most preferably less than 10 mole %, based on the total moles of polyisocyanates used.

Suitable uretonimine modified diisocyanates can also be used and are prepared by a process wherein a polyisocyanate, generally an aromatic polyisocyanate, is heated to a temperature exceeding the melting temperature of the polyisocyanate, for example, 140° C., in the presence of a carbodiimide catalyst to convert some of the isocyanate groups to carbodiimide groups and then allowing the carbodiimide groups to react with unreacted isocyanate groups to form uretonimine groups.

Suitable isocyanate terminated prepolymers are also useful. These can be prepared by reacting an excess of polyisocyanate with polyols, which may include aminated polyols. Suitable polyols include, for example;

(a) polyether polyols and/or hydrocarbon-based polyols having a molecular weight from 60 to 400, and an average hydroxyl functionality from 1.9 to 2.5;

(b) polyether (and/or thioether) polyols having a molecular weight of at least 1000 and an average hydroxyl functionality from 1.9 to 4;

(c) polyester polyols having a molecular weight from 100 to 1000, and an average hydroxyl functionality from 1.9 to 2.5;

(d) polyester polyols having a molecular weight greater than 1000, and an average amine hydrogen functionality from 1.9 to 4;

(e) amine terminated polyethers having a molecular weight of at least 1000, and an average amine hydrogen functionality from 1.9 to 6.

Examples of suitable polyether or hydrocarbon polyols having a molecular weight from 60 to 400 include propylene glycol; dipropylene glycol; tripropylene glycol; 2,3-butanediol; 1,3-butanediol 2,2-dimethyl-1,3-propanediol and polypropylene glycols. Examples of suitable polyether polyols having a molecular weight of at least 1000 include polyethylene glycols; polyoxyethylene polyoxypropylene copolymer diols; and polytetramethylene glycols, higher polypropylene glycols, polyoxypropylene triols, etc. Ethylene oxide-capped polyoxypropylene based polyols are preferred.

Examples of suitable polyester polyols having a molecular weight from 100 to 500 include aliphatic polyester diols, and aromatic polyester diols. These polyester diols are obtained from the reaction of dibasic carboxylic acids such as succinic, adipic, suberic, azelic, phthalic, isophthalic, and the like, with alkylene glycols, and oxyalkylene glycols to form the corresponding polyalkylene, and polyoxyalkylene ester diols or copolymers thereof. Examples of suitable polyester polyols having a molecular weight of at least 1000 include the polyester diols and triols obtained from the reaction of polybasic carboxylic acids, and alkylene polyols, and/or oxyalkylene polycols, to form the corresponding polyalkylene and polyoxyalkylene esters or copolymers thereof having a molecular weight of at least 1000.

Examples of suitable amine-terminated polyethers having a molecular weight of at least 1000 include polypropylene oxide triamines polyoxypropylene diamines, and polyoxyethylene/polyoxypropylene copolymer diamines and triamines.

High molecular weight polyols, component (B)(i), useful in this invention include polyalkylene glycols such as polyoxyethylene glycol, polyoxypropylene glycol, polyoxybutylene glycol, mixtures thereof, and the like having an average molecular weight and functionality as previously defined. Suitable polyols are widely available commercially, for example under the designation "DALTOCEL" from ICI.

Also suitable for use as high molecular weight polyols are polyester polyols. Suitable polyester polyols may be produced by reacting dicarboxylic acids, preferably aliphatic dicarboxylic acids, having 2 to 12 carbon atoms in the alkylene radical, with multifunctional alcohols, preferably diols.

Suitable dicarboxylic acids include, for instance, aliphatic dicarboxylic acids such as glutaric acid, pimelic acid, suberic acid, azelaic acid, sebacic acid, undecanedioic acid, dodecanedioic acid, and preferably, succinic and adipic acids; cycloaliphatic dicarboxylic acids such as 1,3- and 1,4-cyclohexane dicarboxylic acid; and aromatic dicarboxylic acids such as phthalic acid and terephtalic acid. Examples of di- and multifunctional, particularly difunctional, alcohols are: ethylene glycol, diethylene glycol, propylene glycol, dipropylene glycol, 1,3-propanediol, 1,10-decanediol glycerine, trimethylolpropane, and preferably, 1,4-butanediol, and 1,6-hexanediol. If trifunctional alcohols are used for the manufacture of the polyester polyols, their amount is preferably chosen in such a manner that the functionality is a maximum of 2.8, preferably 2 to 2.3.

Also useful are those polyester polyols produced by polycondensation of a dicarboxylic acid mixture which, based on the total weight of the named dicarboxylic acids, contains the following: 20 to 35 percent by weight, preferably 28 to 33 percent by weight, of succinic acid; 35 to 50 percent by weight, preferably 40 to 45 percent by weight, of glutaric acid; and 20 to 32 percent by weight, preferably 24 to 28 percent by weight, of adipic acid; and alcohol mixtures of ethylene glycol/diethylene glycol, ethylene glycol/trimethylolpropane and diethylene glycol/trimethylolpropane. In addition to the named dicarboxylic acids, the dicarboxylic acid mixture may contain up to 5 percent by weight, preferably 2 to 3 percent by weight, based on the total mixture weight, of other adducts, which consist of primarily imides of the succinic and glutaric acids. Dicarboxylic acid mixtures of the named type may, for instance, be obtained as by-products during the manufacture of adipic acid oxidation of cyclohexanol or cyclohexanone with nitric acid. Suitable polyols are available commercially, for example, under the designation "Daltorez" from ICI.

The polyester polyols preferably have molecular weights of 1000 to 7500, most preferably 1500 to 3000, and functionalities of 2 to 3.5, preferably 2 to 2.3, and can be used as such or in the form of mixtures in accordance with this invention.

Low molecular weight polyhydric alcohols (herein also referred to as "chain extenders"), component (B)(ii), useful in this invention, include glycerol, 1,4-butanediol, pentaerythritol, trimethylolpropane, 1,2-propylene glycol, 1,6-hexanediol, 2-ethylhexane-1,3-diol, and the bis (hydroxyethyl) ether of hydroquinone. Oligomeric polyoxyethylene and polyoxypropylene glycols having 2 or more carbon atoms may also be used, i.e. diethylene glycol, triethylene glycol, tetraethylene glycol, pentaethylene glycol, dipropylene glycol, tripropylene glycol, and tetrapropylene glycol. Polyols having a functionality greater than 3 may be employed as part of a polyol mixture, so long as the average functionality of the mixture is less than about 3.

The secondary monoamine, component (B)(iii), has the formula $$R-NH-R'$$

wherein R and R' are independently saturated aliphatic groups having 1 to 20, preferably 2 to 13 carbon atoms, most preferably 2 to 6 carbon atoms, with the proviso that R and $R^1$ together contain at least 4 carbon atoms. Suitable examples include one or a mixture of di-n-butylamine, di-n-propylamine, diethylamine, N-ethyl-N-n-butylamine, and ditridecylamine.

The polyurethanes partially capped with disubstituted urea groups of this invention can be formulated to contain additives as conventionally known and used in elastomer formulations. A nonexhaustive list of typical additives includes pigments for coloration, fillers to reduce economics or to impart special properties or modify existing properties of the elastomer, stabilizers to protect against chemical degradation such as oxidation or discoloration, flame retardants, blowing agents such as halohydrocarbons conventionally known and used for producing foamed resins (available, e.g. under the registered trademark FREON from DuPont or ARCTON from ICI) or carbon dioxide generated in situ by the addition of water, surfactants to stabilize foams (e.g. DOW CORNING[3] silicone glycol copolymers known for use in producing polyurethane foams), defoaming agents to prevent foam formation, catalysts such as amines and organotin compounds conventionally known, biocides to prevent bacterial degradation, perfumes to impart pleasing odors, and plasticizers to modify physical properties of the elastomer such as hardness and elongation.

The amount of additives depends, of course, on the particular additives being used. As a general rule of thumb, the total weight of all additives should not exceed about 60 percent by weight based on the total formulation.

Components (A) and (B) are formated for molding via an open or closed casting process, optionally using low pressure injection, meaning that the coreactants are mixed in the liquid state and injected under low pressure or poured into the final (open or closed) mold. Casting is well known and understood in the art, see for example *Polyurethane Technology*, edited by Paul F. Bruins, Interscience Publishers, especially Chapter 9 titled "Casting of Urethane Elastoplastics". The reactants are metered and mixed and poured or injected into a mold in such a manner that air will not be entrapped. The reactants may be all mixed and poured together in a so-called one shot system. Alternatively, a so-called two-step prepolymer-curative process, wherein excess polyisocyanate is first reacted with a stoichiometrically deficient amount of active hydrogen compound to form an isocyanate-terminated prepolymer, followed by reacting the prepolymer with the remaining active hydrogen compounds, may be employed.

The polyurethanes may be formulated and shaped into molded objects by casting methods conventionally known in the art, generally involving the use of a casting machine. Examples of casting machines include those offered commercially by Klockner Ferromatik Desma, Inc., Sudbury, Mass., including the DS 30/30 and PSA 91 models used in the Examples of this invention.

In the casting process, the polyisocyanate is referred to as the "A" component and the mixture of active hydrogen-containing compounds, components (B)(i)-(B)(iii), is referred to as the "B" component. If additives are employed they are generally incorporated into the B component, although they may also be added in the A component so long as they are not isocyanate-reactive. The B component mixture, including additives, may be blended or agitated in a suitable container or supply tank, generally at ambient temperature, although temperatures up to about 160° F. may be employed. Agitation can be conducted using conventional propeller type stirrers (generally supplied by the casting machine manufacturer) at RPM's of several hundred at most.

The "A" and "B" components are placed in separate containers, which are generally equipped with agitators, of the casting machine wherein the temperature of each component is ambient to 140° F. Molded polyurethane products are made by conducting each component via suitable metering pumps, to a mixing head where the components are mixed under low pressures, generally pressures less than 30 bar, preferably less than 20 bar. The mixed components can then be poured or injected into a mold.

Once a desired mold shape has been filled, the mold is closed and curing is effected. Generally curing temperatures of about 30° F. to about 160° F. can be used. Curing (as reflected by demold times) requires about 3 to 20 minutes, usually about 5 to 15 minutes. This cure time is ample to allow mixing, foaming if desired, and mold filling, yet sufficiently rapid to allow high rates of production. The cure rates obtainable using the compositions of this invention which contain a secondary monoamine (e.g., di-n-butylamine) are to be contrasted with compositions wherein instead of a monoamine, the corresponding primary alcohol (e.g. n-butanol) is used, which primary alcohol-containing compositions generally require much longer demold times.

The reaction of the "A" component and "B" component to make the molded polyurethanes partially capped with disubstituted urea groups of this invention is carried out at an isocyanate index between about 0.90 and about 1.15, preferably between about 0.95 and about 1.10. Most preferably, the reaction is carried out at an isocyanate index substantially equal to 1.

Although the exact proportions of each reactant will vary depending on the individual molecular weights and whether prepolymers are employed, typical proportions, based on using 100 parts by weight (pbw) of high molecular weight polydric alcohol component (B)(i), will be 2-10 pbw of low molecular weight polyhydric alcohol component (B)(ii), 2-60 pbw of secondary monoamine component (B)(iii), and an amount of polyisocyanate component (A) which provides sufficient free isocyanate (—NCO) groups to react essentially stoichoimetrically with the total of active hydrogens provided by (B)(i)-(B)(iii), i.e., an amount sufficient to provide the desired isocyanate index.

The invention is further disclosed and described by means of the following examples which are not to be taken as limiting.

The following glossary of terms is to entify materials used in the examples.

Glossary

| Material | Identity | Supplier |
|---|---|---|
| Daltocel F-2805 (ethylene oxide tipped triol, MW 6000) | Polyether Polyol | ICI |
| NIAX E-351 (M.W. 2800) | Polyether Polyol | Union Carbide |
| NIAX 11-34 (M.W. 5000) | Polyether Polyol | Union Carbide |
| 1,4-Butanediol | Chain Extender | GAF |
| Dipropylene Glycol | Chain Extender | |
| 1,6-Hexanediol | Chain Extender | Badische Coroproation-CBA |
| Diethylene Glycol | Chain Extender | Quaker City |
| DABCO S5-25 | Amine Catalyst | Air Products |
| DABCO 33LV | Amine Catalyst | Air Products |
| FOMREZ UL-1 | Tin Catalyst | Witco |
| Dibutylamine | Secondary Monoamine | Fisher Scientific |
| Di Tridecyl Amine (Adogen 283) | Secondary Monoamine | Sherex |
| PC-1244 | Defoaming Agent | Monsanto |
| SF 96-5 | Surfactant | Union Carbide |
| Dioctyl Phthalate | Plasticizer | Inland Leidy |
| TP 90-B | Plasticizer | Morton-Thiokol |
| $CaCO_3$ | filler | ICI |
| ZEOLITH | Molecular sieves | |
| BAYLITH | Molecular sieves | Mobay |
| ANTIBLAZE 80 | Flame Retardant | Mobil Organic Chemicals |
| ANTIBLAZE 100 | Flame Retardant | Mobil Organic Chemicals |
| ES-76 | MDI-based uretonimine-modified polyisocyanate, terminated poly ether prepolymer Functionality-2.0-2.1 Eq. Wt. 185-195 | ICI |

The formulations set forth in TABLES I-IV are of typical reaction systems according to the invention and list individual component amounts in parts by weight, together with gel times and demold times required for test plaques. "Gel time" as used herein represents the amount of time, from the time pouring of the mixed components into the mold was completed, that the molded article was just set (i.e. polymerized) sufficiently that, if touched lightly with the edge of a metal spatula, no polymer material adhered to the spatula, although the product was rubbery enough that an identation in the material could easily and visibly be made. The gel times using this test are estimated to be accurate to within about ±20%. "Demold time" is the time at which the test plaque was demolded without damage.

The polyisocyanate, a prepolymer, constituted the "A" component and all other ingredients constituted the "B" component. Each component was placed in a separate supply tank and agitation was maintained with a propeller stirrer. The components were mixed using either a Desma model DS 30/30 casting machine or a Desma Model PSA 91 injection machine, both of which are conventional and commercially available. No solvents were employed in either component. Sufficient amounts of the mixed components were poured or injected into the mold to provide a part of the required average density upon completion.

Tables I-IV are set forth, following

TABLE I

Different Secondary Monoamine in the Deformable, Delayed Recovery Polyurethane Systems

| Example | 1 | 2 | 3 | 4 | 5 | 6 | 7 |
|---|---|---|---|---|---|---|---|
| Daltocel F-2805 | 100 | 100 | 100 | 100 | 100 | 100 | 100 |
| Dipropylene Glycol | 4.5 | 4.5 | 4.5 | 4.5 | 4.5 | 4.5 | 4.5 |
| Dabco 33LV | 4 | 4 | 4 | 4 | 4 | 4 | 4 |
| Dibutylamine | 5 | 15 | 25 | 0 | 0 | 0 | 0 |
| Di Tridecyl Amine | 0 | 0 | 0 | 40 | 60 | 60 | 15 |
| PC-1244 | 0.3 | 0.3 | 0.3 | 0.3 | 0.3 | 0.3 | 0.3 |
| Dioctyl Phthalate | 80 | 80 | 80 | 80 | 80 | 80 | 80 |
| $CaCO_3$ | 20 | 20 | 20 | 0 | 0 | 0 | 0 |
| Baylith | 8 | 8 | 8 | 8 | 0 | 8 | 8 |
| Fomrez UL-1 | 0 | 0.05 | 0.05 | 0.08 | 0.12 | 0.12 | 0.08 |
| Freon 11A | 0 | 18 | 0 | 0 | 0 | 0 | 0 |
| $H_2O$ | 0 | 0 | 0 | 0 | .10 | 0 | 0 |
| Total Polyol Component (P) | 221.8 | 249.85 | 241.85 | 236.88 | 249.02 | 256.92 | 211.88 |
| ES-76 Polyisocyanate Polyether Prepolymer (I) | 37.6 | 52.5 | 74.4 | 50 | 61.8 | 59.7 | 37.8 |
| Ratio I/P | 0.17 | 0.21 | 0.308 | 0.211 | 0.248 | 0.232 | 0.178 |
| Gel Time* | 2.0 | 2.40 | 3.20 | 2.40 | 3.20 | 3.20 | 2.20 |
| Demold Time* | 4.0 | 5.0 | 8.0 | 5.0 | 8.0 | 8.0 | 4.0 |

*Times are in minutes and seconds, e.g. 2.40 denotes 2 minutes and 40 seconds.

TABLE II

Different High M.W. Polyols in the Deformable, Delayed Recovery Polyurethane Systems

| Example | 8 | 9 | 10 | 11 | 12 |
|---|---|---|---|---|---|
| Daltocel F-2805 | 100 | 0 | 0 | 0 | 0 |
| NIAX 11-34 Polyether Polyol | 0 | 100 | 33.4 | 66.6 | 80 |
| NIAX E-351 Polyether Polyol | 0 | 0 | 66.6 | 33.4 | 20 |
| Dipropylene Glycol | 4.5 | 4.5 | 4.5 | 4.5 | 4.5 |
| Dabco 33LV | 4 | 4 | 4 | 4 | 4 |
| Dibutylamine | 15 | 15 | 15 | 15 | 15 |
| PC-1244 | 0.3 | 0.3 | 0.3 | 0.3 | 0.3 |
| Dioctyl Phthalate | 80 | 80 | 80 | 80 | 80 |
| Baylith | 8 | 8 | 8 | 8 | 8 |
| Fomrez UL-1 | 0.16 | 0.08 | 0.08 | 0.08 | 0.08 |
| Total Polyol Component (P) | 221.96 | 211.88 | 211.88 | 211.88 | 211.88 |
| ES-76 Polyether Prepolymer (I) | 52.5 | 54.6 | 56 | 55.3 | 55 |
| Ratio I/P | 0.237 | 0.258 | 0.264 | 0.261 | 0.26 |
| Gel Time* | 3.0 | 3.0 | 5.0 | 4.0 | 3.30 |
| Demold Time* | 6.0 | 6.0 | 12.0 | 9.0 | 8.0 |

*See Table I

TABLE III

Different Chain Extenders in the Deformable, Delayed Recovery Polyurethane Systems

| Example | 13 | 14 | 15 | 16 | 17 |
|---|---|---|---|---|---|
| Daltocel F-2805 | 100 | 100 | 100 | 100 | 100 |
| Dabco 33 LV | 0 | 4 | 4 | 4 | 4 |
| Dabco S-25 | 2 | 0 | 0 | 0 | 0 |
| PC-1244 | 0.3 | 0.3 | 0.3 | 0.3 | 0.3 |
| Dioctyl Phthalate | 80 | 40 | 80 | 80 | 80 |
| Baylith | 8 | 8 | 8 | 8 | 8 |
| Fomrez UL-1 | 0 | 0 | 0.08 | 0.08 | 0.08 |
| Dibutylamine | 5 | 5 | 15 | 15 | 15 |
| Dipropylene Glycol | 0 | 4.5 | 1.8 | 2 | 4 |
| 1,6-Hexandiol | 0 | 0 | 2.7 | 0 | 0 |
| Diethylene Glycol | 0 | 0 | 0 | 2 | 4 |
| 1,4-Butanediol | 2 | 0 | 0 | 0 | 0 |
| $CaCO_3$ | 40 | 20 | 0 | 0 | 0 |
| Total Polyol Component (P) | 237.3 | 181.8 | 211.88 | 211.38 | 215.38 |
| ES-76 Polyether Prepolymer (I) | 44.8 | 37.6 | 53.1 | 52.3 | 65.6 |
| Ratio I/P | 0.189 | 0.207 | 0.251 | 0.247 | 0.305 |
| Gel Time* | 2.0 | 2.0 | 2.40 | 2.40 | 2.40 |
| Demold Time* | 4.0 | 4.0 | 6.0 | 6.0 | 6.0 |

*See Table I

TABLE IV

Different Additives in the Deformable, Delayed Recovery Polyurethane Systems

| Example | 18 | 19 | 20 | 21 | 22 | 23 | 24 |
|---|---|---|---|---|---|---|---|
| Daltocel F-2805 | 100 | 100 | 100 | 100 | 100 | 100 | 100 |
| Dipropylene Glycol | 4.5 | 4.5 | 4.5 | 4.5 | 4.5 | 4.5 | 4.5 |
| Dabco 33 LV | 4 | 4 | 4 | 4 | 4 | 4 | 4 |
| Dibutylamine | 5 | 15 | 15 | 15 | 15 | 15 | 15 |
| PC-1244 | 0.3 | 0.3 | 0.3 | 0.3 | 0.3 | 0.3 | 0.3 |
| Dioctyl Phthalate | 80 | 80 | 80 | 40 | 80 | 0 | 40 |
| TP-90B | 0 | 0 | 0 | 40 | 0 | 0 | 0 |
| $CaCO_3$ | 40 | 20 | 0 | 20 | 40 | 20 | 20 |
| Baylith | 8 | 8 | 8 | 8 | 8 | 8 | 8 |
| Fomrez UL-1 | 0 | 0 | 0 | 0.16 | 0.08 | 0.05 | 0.05 |
| Antiblaze 80 | 0 | 0 | 0 | 0 | 0 | 80 | 0 |
| Antiblaze 100 | 0 | 0 | 0 | 0 | 0 | 0 | 40 |
| Total Polyol Component (P) | 241.8 | 231.8 | 211.8 | 231.96 | 251.88 | 231.85 | 231.85 |
| ES-76 Polyether Prepolymer (I) | 37.6 | 52.5 | 52.5 | 52.5 | 52.5 | 52.5 | 52.5 |
| Ratio I/P | 0.156 | 0.226 | 0.248 | 0.226 | 0.208 | 0.226 | 0.226 |
| Gel Time* | 1.40 | 2.50 | 3.20 | 1.30 | 2.0 | 2.20 | 2.20 |

TABLE IV-continued

| | Different Additives in the Deformable, Delayed Recovery Polyurethane Systems | | | | | | |
|---|---|---|---|---|---|---|---|
| Example | 18 | 19 | 20 | 21 | 22 | 23 | 24 |
| Demold Time* | 3.0 | 6.0 | 7.0 | 3.0 | 4.0 | 4.30 | 4.30 |

*See Table I

EXAMPLES 25-35

Examples 25-35 are intended to show the improvement in cure time (as reflected in demold time), and improvements in physical properties, of test plaques made from reaction systems according to the invention, relative to similar compositions wherein a primary alcohol (e.g. n-butanol) is substituted for a secondary monoamine (e.g. di-n-butylamine).

A blend of ingredients for use in the "B" component was prepared containing the following proportions (in parts by weight, pbw):

| Daltocel F-2805 | 100 |
|---|---|
| Dipropylene glycol | 4.5 |
| Dabco 33 LV | 4.0 |
| PC-1244 | 0.3 |
| CaCO$_3$ | 20.0 |
| Baylith | 8.0 |
| Fomrez UL-1 | 0.02 |
| Total | 136.82 |

The above blend, herein denoted as the "Master Batch" was used to formulate various test plaques from polyurethanes partially capped with disubstituted urea groups according to the invention, and various comparative polyurethanes wherein the di-n-butylamine was replaced by n-butanol in an amount such that the reaction isocyanate index was maintained at 1.00. The master batch was combined with the remaining ingredients in the (pbw) amounts listed in Table V to make the "B" component, and the "B" component was combined with ES-76, the A component, to make test plaques having the gel times, demold times, and physical properties also listed in Table V.

The molded articles of Examples 25-35 were made using a Desma DS 30/30 machine wherein the holding tanks for both the "A" and "B" components were at room temperature and the mold temperature was 50° C.

The physical properties shown in Table V were determined according to tests well known to the art. Tensile strength, elongation, and tensile modulus were determined according to ASTM D412. Shore A hardness was determined accordng to ASTM D2240. Tear resistance (Die C tear) was determined according to ASTM D624. Ball resilience was determined according to ASTM D3574.

TABLE V

| Example | 25 | 26 | 27 | 28 | 29 | 30++ | 31++ | 32 | 33 | 34 | 35++ |
|---|---|---|---|---|---|---|---|---|---|---|---|
| "A" Comp. | | | | | | | | | | | |
| Master Batch | 136.82 | 136.82 | 136.82 | 136.82 | 136.82 | 136.82 | 136.82 | 136.82 | 136.82 | 136.82 | 136.82 |
| Dioctyl Phthalate | 0 | 40 | 80 | 40 | 80 | 40 | 40 | 40 | 80 | 40 | 0 |
| Di-n-butylamine | 0 | 0 | 0 | 15 | 15 | 0 | 0 | 0 | 0 | 0 | 15 |
| n-butanol | 0 | 0 | 0 | 0 | 0 | 8.6 | 4.3 | 2.15 | 2.15 | 3.22 | 0 |
| Total (P) | 136.82 | 176.82 | 216.82 | 191.82 | 231.82 | 185.42 | 181.12 | 178.97 | 218.97 | 180.04 | 151.82 |
| "B" Comp. | 30 | 30 | 30 | 52.2 | 52.2 | 52.2 | 41.2 | 35.6 | 35.6 | 38.3 | 52.2 |
| ES-76 (I) | | | | | | | | | | | |
| Ratio (I/P) | 0.219 | 0.17 | 0.138 | 0.272 | 0.225 | 0.282 | 0.227 | 0.199 | 0.163 | 0.213 | 0.344 |
| Isocyanate Index | 1.00 | 1.00 | 1.00 | 1.00 | 1.00 | 1.00 | 1.00 | 1.00 | 1.00 | 1.00 | 1.00 |
| Gel Time* | 1.0 | 1.50 | 2.40 | 1.30 | 2.20 | 3.0 | 2.50 | 2.10 | 3.0 | 4.0 | 1.10 |
| Demold Time* | 3.0 | 4.0 | 5.0 | 4.0 | 5.0 | DNC** | 60.0+ | 13.0 | 22.0 | 60.0+ | 3.0 |
| Physical Properties | | | | | | | | | | | |
| Hardness, Shore A | 45-50 | 40-45 | 30-35 | 20-25 | 10-15 | | | 10 | 10 | | 35-40 |
| Tensile, PSI | 171 | 178 | 112 | 266 | 166 | | | 40 | 14 | | 290 |
| Elonglition, % | 131 | 172 | 138 | 409 | 375 | | | 600 | 560 | | 459 |
| Die C Tear, PLI | 50.1 | 38.1 | 28.1 | 33.3 | 24.2 | | | 20.7 | 13.1 | | 52.8 |
| Ball Residience, % | 28 | 29 | 34 | 20 | 18 | | | 14 | 14 | | 23 |
| Modules, PSI | | | | | | | | | | | |
| @ 100% Elongation | 236 | 225 | 172 | 76 | 47 | | | 7 | 1 | | 66 |
| @ 200% Elongation++ | | | | 89 | 61 | | | 4 | 1 | | 51 |
| @ 300% Elongation++ | | | | 113 | 79 | | | 2 | 1 | | 51 |

*See Table 1
**DNC = Did not cure
+Sample took longer than 60 minutes to cure
++Blank spaces indicate samples were too soft to conduct physical test measurements

EXAMPLE 36

A polyurethane is made as in Example 28, except that di-n-butylamine and ES-76 are replaced, respectively, by an equal amount of di-n-propylamine and an amount of LF 168 (a uretonimine modified 4,4'-diphenylmethanediisocyanate having an average isocyanate equivalent weight of about 143, commercially available from Rubicon Chemicals, Inc.) such that the reaction is conducted to an isocyanate index substantially equal to 1. Gel and demold times, and physical properties similar to those shown for Examples 28, 29 and 35 are obtained for the polyurethane.

EXAMPLE 37

A polyurethane is made as in Example 28, except that di-n-butylamine and ES-76 are replaced, respectively, by an equal amount of diethylamine and an amount of a polyisocyanate which is a mixture of diphenylmethanediisocyanates containing about 80% 4,4'-isomer and about 20% of 2,4'-isomer such that the reaction is conducted at an isocyanate index substantially equal to 1. Gel and demold times, and physical properties similar to those shown for Examples 28, 29, and 35 are obtained for the polyurethane.

EXAMPLE 38

A polyurethane is made as in Example 28, except that di-n-butylamine and ES-76 are replaced, respectively, by an equal amount of ditridecylamine and an amount of a polyisocyanate (polyphenylmethylene polyisocyanate, crude MDI, having an average isocyanate equivalent weight of about 133.3 and an average isocyanate functionality of 2.75; commercially available from Rubicon Chemicals, Inc. as RUBINATE[3] M) such that the reaction is conducted at an isocyanate index substantially equal to 1. Gel and demold times, and physical properties similar to those shown for Examples 28, 29, and 35 are obtained for the polyurethane.

The polyurethanes of this invention may be used in a variety of applications including the manufacture of shoe insoles or components thereof. The polymers have good elongation, recover their molded shape well, and have a skinlike feel, and thereby can be used in the toy industry to make objects requiring such characteristics, such as body parts (head, limbs, torso) for dolls and other toys made of rubber.

The compositions of this invention have further utility in applications which require shock attenuation, energy absorption, or sound deadening capabilities, which applications include but are not limited to the manufacture of orthotic devices (such as arch supports), packing material, turntable pads for record players, linings for speaker cabinets, protective athletic cushioning devices such as elbow pads or knee pads, and grips for handles (such as tennis raquets) to reduce shock transmitted through the racquet to a user.

The polyurethanes of this invention are particularly suited to being molded into flat sheets by processes as described herein from which articles such as shoe insoles can be die cut or otherwise cut.

Those skilled in the art will appreciate that many modifications to the exemplary embodiments presented herein may be made without departing from the scope of the invention. Accordingly, all such modifications are considered to be part of the invention as defined in the appended claims.

What is claimed is:

1. A reaction system for use in making molded objects by an open or closed casting process, said system comprising the following components:
   (A) an aromatic polyisocyanate; and
   (B) an active hydrogen-containing composition comprising
      (i) a polyhydric alcohol having an average molecular weight in the range of about 1000 to about 8000 and an average functionality of about 2 to about 4;
      (ii) a polyhydric alcohol having 2 to 12 carbon atoms and an average functionality of about 2 to about 3; and
      (iii) a secondary monoamine of the formula

R—NH—R' wherein R and R' are independently saturated aliphatic groups having 1 to 20 carbon atoms, provided that R and R[1] together contain at least 4 carbon atoms, the ratio of (A) to (B) being such that the reaction of said system is conducted at an isocyanate index between about 0.90 and about 1.15,
wherein said system, components (A) and (B), react to form a polyurethane partially capped with disubstituted urea groups.

2. A system as defined in claim 1, wherein said polyisocyanate is p-phenylene diisocyanate, m-phenylene diisocyanate, 2,4-toluene diisocyanate, 2,6-toluene diisocyanate, naphthalene diisocyanate, dianisidine diisocyanate, 2,4'-diphenylmethane diisocyanate (2,4'-MDI), 4,4'-diphenylmethane diisocyanate (4,4'-MDI), 3,3'-dimethyl-4,4'-biphenylene diisocyanate, polydiphenylmethane diisocyanate having a functionality greater than 2, or mixtures thereof.

3. A system as defined in claim 1, wherein said polyisocyanate is a polymethylenepolyphenyl polyisocyanate composition having an average isocyanate functionality greater than 2.

4. A system as defined in claim 1, wherein said polyisocyanate comprises crude diphenylmethane diisocyanate.

5. A system as defined in claim 1, wherein said polyisocyanate has an average isocyanate functionality between about 2 and about 2.3.

6. A system as defined in claim 1, wherein said polyisocyanate comprises up to about 50 mole % of aliphatic polyisocyanates.

7. A system as defined in claim 6, wherein said polyisocyanate comprises less than 30 mole % of aliphatic polyisocyanates.

8. A system as defined in claim 7, wherein said polyisocyanate comprises less than 10 mole % of aliphatic polyisocyanates.

9. A system as defined in claim 6, wherein said aliphatic polyisocyanates are selected from isophorone diisocyanate, 1,6-hexamethylene diisocyanate, 1,4-cyclohexyl diisocyanate, saturated analogues thereof, and mixtures thereof.

10. A system as defined in claim 1, wherein said polyisocyanate is a uretonimine-modified diisocyanate.

11. A system as defined in claim 1, wherein said polyisocyanate is an isocyanate-terminated prepolymer.

12. A system as defined in claim 1, wherein said high molecular weight polyhydric alcohol, component (B)(i), is a polyoxyalkylene glycol.

13. A system as defined in claim 12, wherein said polyalkylene glycol is selected from poly(ethylene glycol), poly(propylene glycol), poly(butylene glycol), and mixtures thereof.

14. A system as defined in claim 1, wherein said high molecular weight polyhydric alcohol, component (B)(i), is a polyester polyol.

15. A system as defined in claim 1, wherein said low molecular weight polyhydric alcohol, component (B)(ii), is selected from glycerol, 1,4-butanediol, pentaerythritol, trimethylolpropane, 1,2-propylene glycol, 1,6-hexanediol, 2-ethyl-hexane-1,3-diol, and the bis (hydroxyethyl) ether of hydroquinone.

16. A system as defined in claim 1, wherein said low molecular weight polyhydric alcohol, component (B)(ii), is an oligomeric poly(ethylene glycol) or poly(propylene glycol).

17. A system as defined in claim 1, wherein, in said secondary monoamine, R and R' independently contain 1 to 13 carbon atoms.

18. A system as defined in claim 17, wherein R and R' independently contain 1 to 6 carbon atoms.

19. A system as defined in claim 1, wherein said secondary monoamine is selected from di-n-butylamine, di-n-propylamine, diethylamine, and ditridecylamine.

20. A system as defined in claim 1, further comprising up to 60 weight percent of additives based on the total weight of the system.

21. A polyurethane which is the reaction product of:
(A) an aromatic polyisocyanate; and
(B) an active hydrogen-containing composition comprising
  (i) a polyhydric alcohol having an average molecular weight in the range of about 1000 to about 8000 and an average functionality of about 2 to about 4;
  (ii) a polyhydric alcohol having 2 to 12 carbon atoms and an average functionality of about 2 to about 3; and
  (iii) a secondary monoamine of the formula R—NH—R′ 

wherein R and R′ are independently saturated aliphatic groups having 1 to 20 carbon atoms, provided that R and $R^1$ together contain at least 4 carbon atoms,
  the ratio of (A) to (B) being such that said reaction is conducted at an isocyanate index between about 0.90 and about 1.15.

22. A polyurethane as defined in claim 21, wherein said polyisocyanate is p-phenylene diisocyanate, m-phenylene diisocyanate, 2,4-toluene diisocyanate, 2,6-toluene diisocyanate, naphthalene diisocyanate, dianisidine diisocyanate, 2,4′-diphenylmethane diisocyanate (2,4′-MDI), 4,4′-diphenylmethane diisocyanate (4,4′-MDI), 3,3′-dimethyl-4,4′-biphenylene diisocyanate, polydiphenylmethane diisocyanate having a functionality greater than 2, or mixtures thereof.

23. A polyurethane as defined in claim 21, wherein said polyisocyanate is a polymethylenepolyphenyl polyisocyanate composition having an average isocyanate functionality greater than 2.

24. A polyurethane as defined in claim 21, wherein said polyisocyanate comprises crude diphenylmethane diisocyanate.

25. A polyurethane as defined in claim 21, wherein said polyisocyanate has an average isocyanate functionality between about 2 and about 2.3.

26. A polyurethane as defined in claim 21, wherein said polyisocyanate comprises up to about 50 mole % of aliphatic polyisocyanates.

27. A polyurethane as defined in claim 26, wherein said polyisocyanate comprises less than 30 mole % of aliphatic polyisocyanates.

28. A polyurethane as defined in claim 27, wherein said polyisocyanate comprises less than 10 mole % of aliphatic polyisocyanates.

29. A polyurethane as defined in claim 26, wherein said aliphatic polyisocyanate is isophorone diisocyanate, 1,6-hexamethylene diisocyanate, 1,4-cyclohexyl diisocyanate, saturated analogues thereof, or mixtures thereof.

30. A polyurethane as defined in claim 21, wherein said polyisocyanate is a uretonimine-modified diisocyanate.

31. A polyurethane as defined in claim 21, wherein said polyisocyanate is an isocyanate-terminated prepolymer.

32. A polyurethane as defined in claim 21, wherein said high molecular weight polyhydric alcohol, component (B)(i), is a polyalkylene glycol.

33. A polyurethane as defined in claim 32, wherein said polyalkylene glycol is selected from poly(ethylene glycol), poly(propylene glycol), poly(butylene glycol), and mixtures thereof.

34. A polyurethane as defined in claim 21, wherein said high molecular weight polyhydric alcohol, component (B)(i), is a polyester polyol.

35. A polyurethane as defined in claim 21, wherein said low molecular weight polyhydric alcohol, component (B)(ii), is selected from glycerol, 1,4-butanediol, pentaerythritol, trimethylolpropane, 1,2-propylene glycol, 1,6-hexanediol, 2-ethyl-hexane-1,3-diol, and the bis(hydroxyethyl) ether of hydroquinone.

36. A polyurethane as defined in claim 21, wherein said low molecular weight polyhydric alcohol, component (B)(ii), is an oligomeric poly(ethylene glycol) or poly(propylene glycol).

37. A polyurethane as defined in claim 21, wherein, in said secondary monoamine, R and R′ independently contain 1 to 13 carbon atoms.

38. A polyurethane as defined in claim 37, wherein R and R′ independently contain 1 to 6 carbon atoms.

39. A polyurethane as defined in claim 21, wherein said secondary monoamine is selected from di-n-butylamine, di-n-propylamine, diethylamine, and ditridecylamine.

40. A polyurethane as defined in claim 21, further comprising up to 60 weight percent of additives based on the total weight of the system.

41. A molded article made from a polyurethane as defined in claim 21, by an open or closed casting process.

42. An article as defined in claim 41, in the form of a shoe insole.

43. An article as defined in claim 41, in the form of a body portion for a doll.

44. An active hydrogen composition comprising, in the proportions noted,
(i) 100 parts by weight of a polyhydric alcohol having an average molecular weight in the range of about 1000 to about 8000 and an average functionality of about 2 to about 4;
(ii) 2 to 10 parts by weight of a polyhydric alcohol having 2 to 12 carbon atoms and an average functionality of about 2 to about 3; and
(iii) 2 to 60 parts by weight of a secondary monoamine of the formula R—NH—R′ 

wherein R and R′ are independently saturated aliphatic groups having 1 to 20 carbon atoms, provided that R and $R^1$ together contain at least 4 carbon atoms.

45. A composition as defined in claim 44 wherein said high molecular weight polyhydric alcohol, component (B)(i), is a polyoxyalkylene glycol.

46. A composition as defined in claim 45 wherein said polyalkylene glycol is selected from poly(ethylene glycol), poly(propylene glycol), poly(butylene glycol), and mixtures thereof.

47. A composition as defined in claim 44 wherein said high molecular weight polyhydric alcohol, component (B)(i), is a polyester polyol.

48. A composition as defined in claim 44 wherein said low molecular weight polyhydric alcohol, component (B)(ii), is selected from glycerol, 1,4-butanediol, pentaerythritol, trimethylolpropane, 1,2-propylene glycol, 1,6-hexanediol, 2-ethylhexane-1,3-diol, and the bis (hydroxyethyl) ether of hydroquinone.

49. A composition as defined in claim 44 wherein said low molecular weight polyhydric alcohol, component (B)(ii), is an oligomeric poly(ethylene glycol) or poly(propylene glycol).

50. A composition as defined in claim 44 wherein, in said secondary monoamine, R and R' independently contain 2 to 13 carbon atoms.

51. A composition as defined in claim 50 wherein R and R' independently contain 2 to 6 carbon atoms.

52. A composition as defined in claim 44 wherein said secondary monoamine is selected from di-n-butylamine, di-n-propylamine, diethylamine, and ditridecylamine.

* * * * *